United States Patent

Liu

(10) Patent No.: US 8,550,925 B2
(45) Date of Patent: Oct. 8, 2013

(54) UNIVERSAL JOINT

(71) Applicant: Zhen-Xing Liu, Shenzhen (CN)

(72) Inventor: Zhen-Xing Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/648,427

(22) Filed: Oct. 10, 2012

(65) Prior Publication Data

US 2013/0165242 A1 Jun. 27, 2013

(30) Foreign Application Priority Data

Dec. 22, 2011 (CN) .......................... 2011 1 0435044

(51) Int. Cl.
*F16D 3/44* (2006.01)
(52) U.S. Cl.
USPC .......................................... 464/136; 464/904
(58) Field of Classification Search
USPC ............. 464/11, 14, 112, 119, 128, 130–132, 464/136, 904
See application file for complete search history.

(56) References Cited

U.S. PATENT DOCUMENTS

| | | | | | |
|---|---|---|---|---|---|
| 1,143,659 | A | * | 6/1915 | Stern | 464/136 |
| 1,621,215 | A | * | 3/1927 | Peters | 464/132 X |
| 3,110,166 | A | * | 11/1963 | Shutt, Jr. | 464/136 |
| 3,662,569 | A | * | 5/1972 | Williams | 464/128 |
| 4,371,358 | A | * | 2/1983 | Laue | 464/136 |
| 5,989,125 | A | * | 11/1999 | Lindenthal | 464/136 |

* cited by examiner

*Primary Examiner* — Gregory Binda
*Assistant Examiner* — Josh Skroupa
(74) *Attorney, Agent, or Firm* — Altis Law Group, Inc.

(57) ABSTRACT

A universal joint includes a first rotating assembly, a second rotating assembly and a linking member. The first rotating assembly includes a rotating member including a main body and a pair of rotating portions extending from opposite ends of the main body, a pivotal member rotatably connected to the pair of the rotating portions, and a pair of locking members respectively engaging with opposite ends of the pivotal member to prevent the pivotal member detaching from the rotating member. The second rotating assembly is the same as the first rotating assembly. The linking member extends into the pivotal member of the first rotating assembly and engages with the pivotal member of the second rotating assembly to connect the two pivotal members together.

13 Claims, 5 Drawing Sheets

UNIVERSAL JOINT

BACKGROUND

1. Technical Field

The present disclosure relates to a rotation joint, and more particularly to a universal joint.

2. Description of Related Art

A universal joint may include a linking member and a pair of rotating assemblies. Each rotating assembly includes a rotating member, a pivotal member, a pair of first sleeving members, a pair of second sleeving members and a pair of locking members. The linking member has substantially a block shape, and defines a first pivotal hole and a second pivotal hole perpendicularly intersecting with the first pivotal hole thereon. The rotating member includes a pair of rotating portions and defines a cutout by the pair of rotating portions. The linking member is received in the cutout of the rotating member, the pivotal member passes through the first pivotal hole and is rotatably connected to the pair of rotating portions of the rotating members by opposite ends. The first sleeving member is sleeved on the pivotal member and received in the first pivotal hole, the second sleeving member is sleeved on the pivotal member and received in the rotating portion. The locking member engages with an end of the pivotal member to prevent the pivotal member detaching from the rotating members. However, when in use, the pivotal member rubs with the first sleeving member and the second sleeving member frequently, thus the pivotal member may wear out easily.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
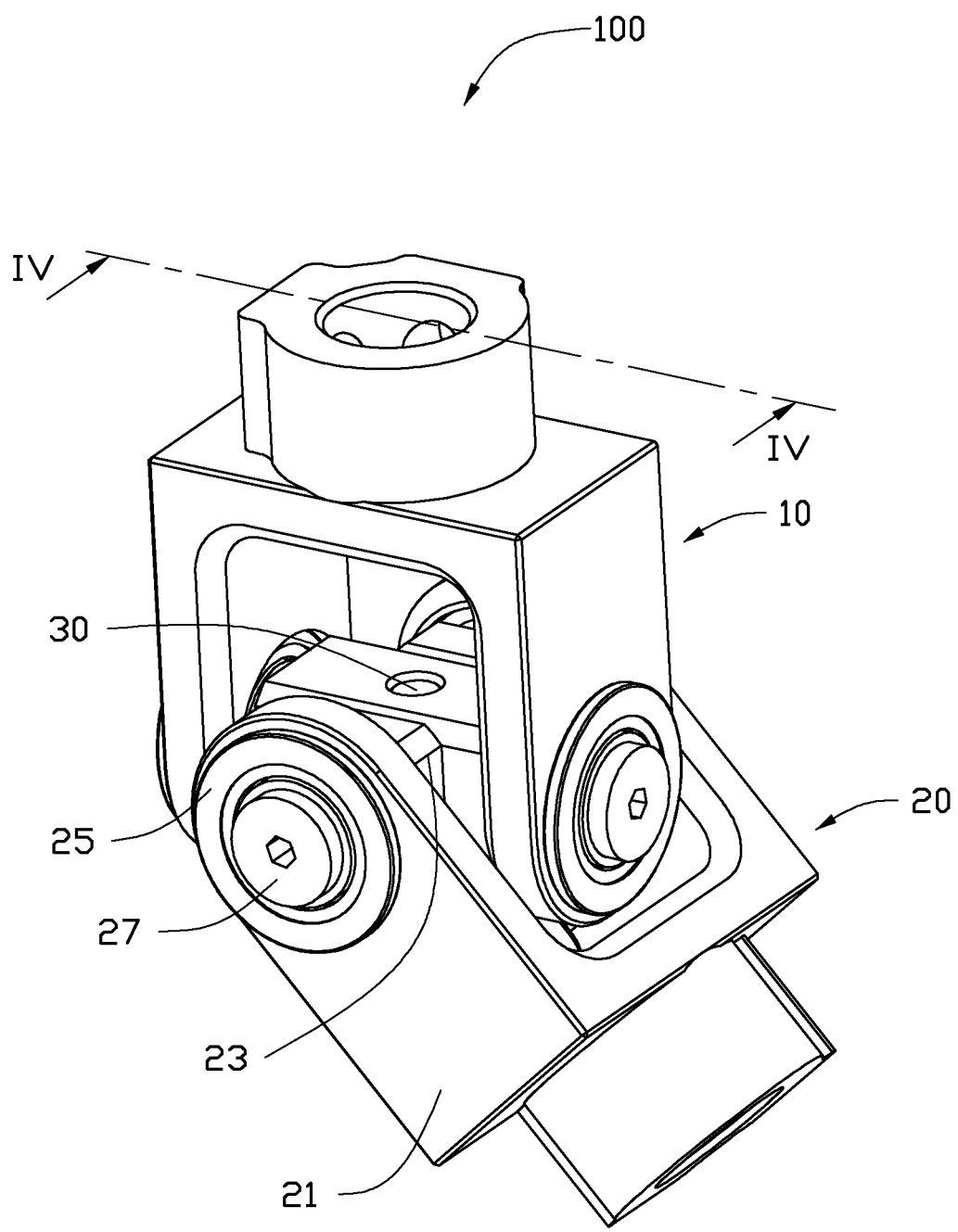
FIG. 1 is an assembled, isometric view of an embodiment of a universal joint having a first rotating assembly.

FIG. 1 shows an embodiment of a universal joint 100. The universal joint 100 includes a first rotating assembly 10, a second rotating assembly 20 and a linking member 30. The first rotating assembly 10 is rotatably connected to the second rotating assembly 20 via the linking member 30.

Figure 2:
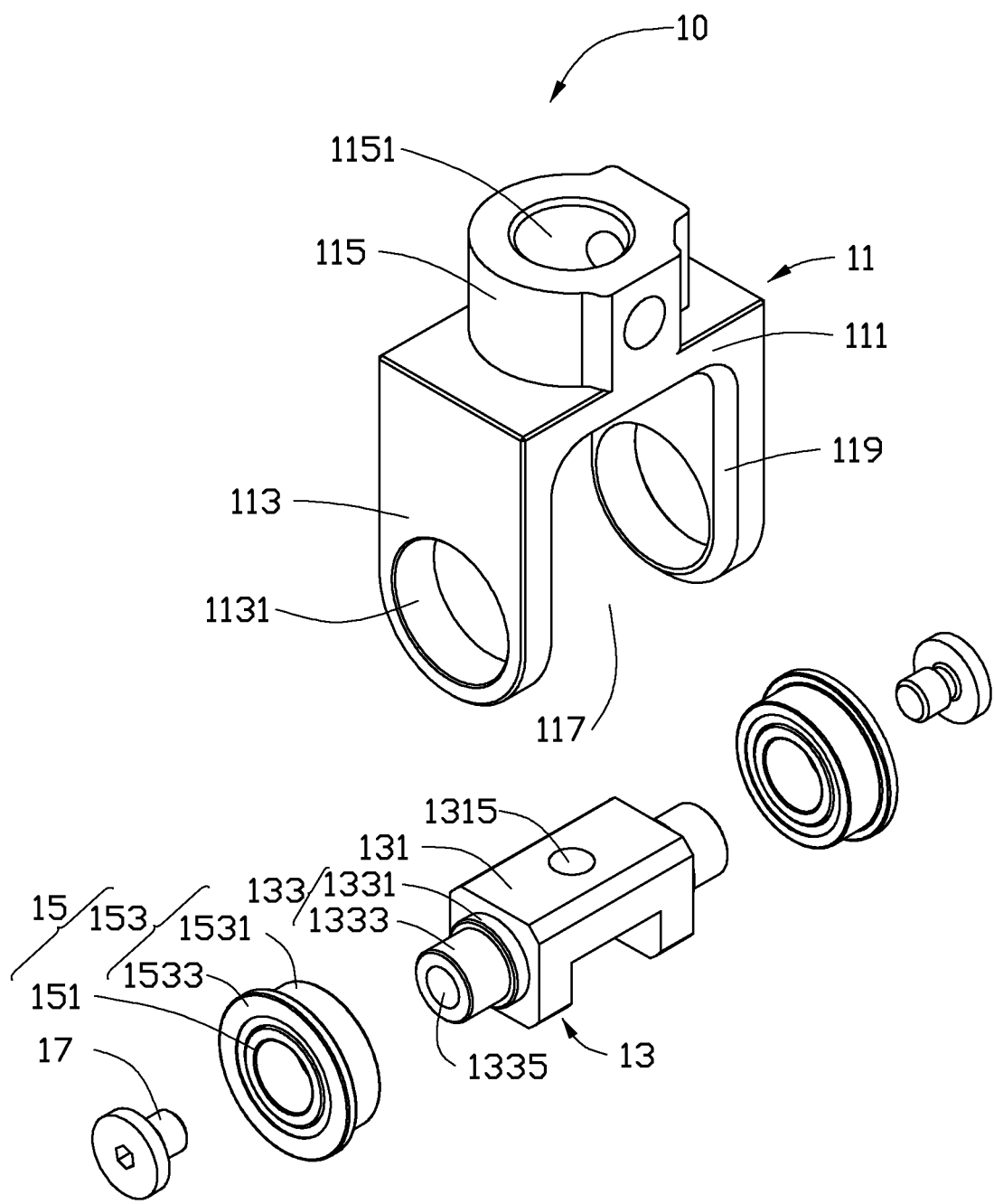
FIG. 2 is an exploded, isometric view of the first rotating assembly of the universal joint of FIG. 1.

Also referring to FIG. 2, the first rotating assembly 10 includes a rotating member 11, a pivotal member 13, a pair of bearings 15 and a pair of locking members 17. The pivotal member 13 is rotatably connected to the rotating member 11 by two ends thereof via the pair of bearings 15. The pair of locking members 17 passes through the pair of bearings 15, respectively, to engage with the opposite ends of the pivotal member 13.

Figure 3:
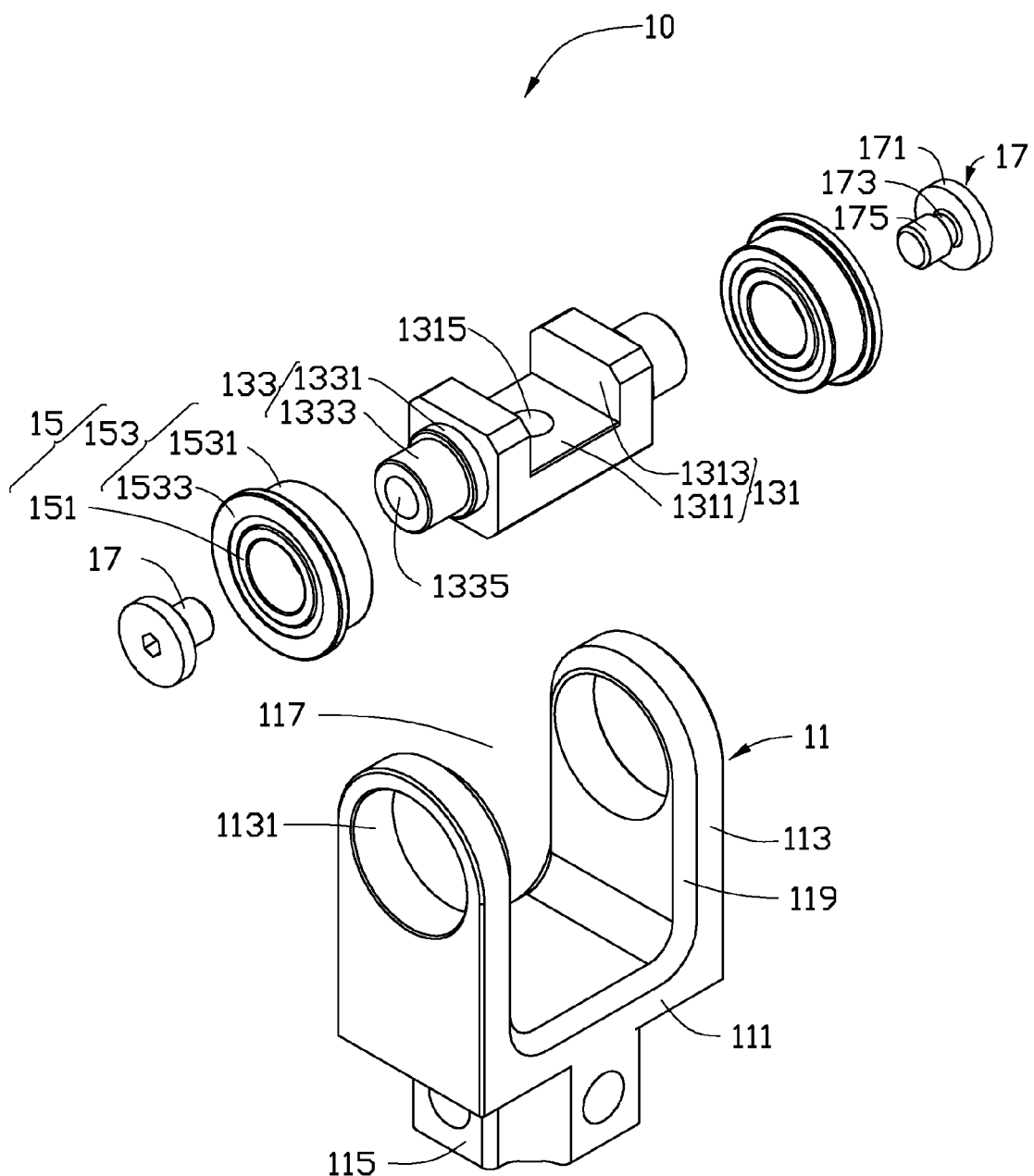
FIG. 3 is similar to FIG. 2, but viewed from another aspect.
Figure 4:
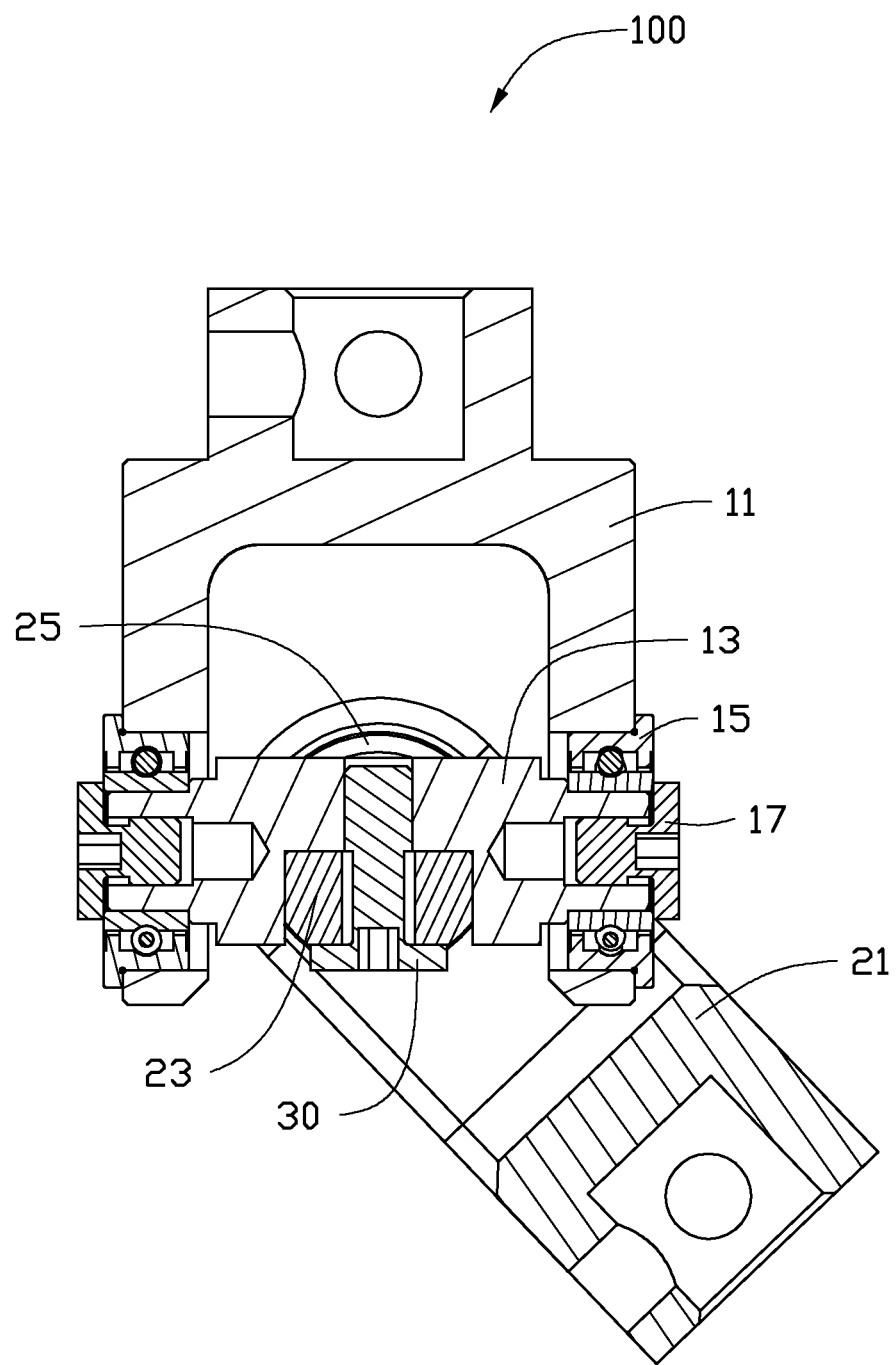
FIG. 4 is a sectional view of the universal joint of FIG. 1, taken along line IV-IV.

Referring to FIGS. 3 and 4, the rotating member 11 includes a main body 111, a pair of rotating portions 113 and a connecting portion 115. The pair of rotating portions 113 perpendicularly extends from opposite ends of a side surface of the main body 111, respectively. The connecting portion 115 perpendicularly extends from a middle portion of another side surface of the main body 111 away from the pair of rotating portions 113. The main body 111 and the pair of rotating portions 113 cooperatively define a substantially "U"-shape cutout 117 therebetween. Each rotating portion 113 has a bar shape, and a distal end of the rotating portion 113 away from the connecting portion 115 has a semicircular shape. Each rotating portion 113 defines a rotating hole 1131 at the distal end thereof away from the main body 111. The pair of rotating portions 113 and the main body 111 cooperatively defines a chamfered edge 119 thereon corresponding to the cutout 117. The connecting portion 115 axially defines a connecting hole 1151 therein.

The pivotal member 13 is rotatably mounted on the rotating member 11. The pivotal member 13 includes a base body 131, and a pair of pivotal portions 133 extending outwardly from opposite ends of the base body 131. The pair of pivotal portions 133 is rotatably received in the pair of rotating holes 1131 of the rotating member 11. The base body 131 is substantially in a "U" shape. The base body 131 defines a pivotal groove 1311 on a middle portion of one side surface thereof, such that a pair of fixing portions 1313 is formed at opposite ends thereof. The base body 131 defines a pivotal hole 1315 on a bottom of the pivotal groove 1311. The pivotal hole 1315 is a screw hole. Each pivotal portion 133 is substantially a stepped shaft and extends outwardly from one corresponding fixing portion 1313 along a direction coaxial to the base body 131. Each pivotal portion 133 includes a resisting end 1331 connected to the fixing portion 1313 of the base body 131, and a shaft end 1333 connected to the resisting end 1331. A diameter of the shaft end 1333 is less than a diameter of the resisting end 1331. Each pivotal portion 133 axially defines a mounting hole 1335 therein extending through the shaft end 1333 and the resisting end 1331.

The pair of bearings 15 are received in the pair of the rotating holes 1131 of the rotating member 11, respectively, and sleeved on the pair of pivotal portions 133, respectively, to rotatably connect the pivotal member 13 to the rotating member 11. Each bearing 15 includes an inner ring 151 and an outer ring 153 rotatably sleeved on the inner ring 151. The outer ring 153 includes a circular base 1531 and a blocking portion 1533 extending from an end of the base 1531 outwardly along a radial direction of the base 1531. A diameter of the inner ring 151 is less than the diameter of the resisting end 1331 and greater than the diameter of the shaft end 1333. The inner ring 151 is sleeved on the shaft end 1333 and resisting the resisting end 1331. The blocking portion 1533 has a diameter greater than an internal diameter of the rotating hole 1131 of the rotating member 11 and resists on a periphery portion of the rotating hole 1131.

The pair of locking members 17 extend into the pair of bearings 15, respectively, and engage with the pair of mounting holes 1335 of the pivotal member 13, respectively. Each locking member 17 includes a head portion 171, a rod portion 173 connected to the head portion 171, and an engaging portion 175 coaxially connected to an end of the rod portion 173 away from the head portion 171. The head portion 171 is substantially disk-shaped with a diameter greater than an exterior diameter of the inner ring 151. The engaging portion 175 engages in the mounting hole 1335 of the pivotal member 13. In the embodiment, the locking member 17 is a screw. The engaging portion 175 defines a plurality of threads surrounding thereof.

Referring to FIGS. 1 and 4, the second rotating assembly 20 is similar to the first rotating assembly 10 in structure. The second rotating assembly 20 includes a rotating member 21, a pivotal member 23, a pair of bearings 25 and a pair of locking members 27. The pivotal member 23 defines a pivotal groove (not shown) thereon and a pivotal hole (not shown) on a bottom of the pivotal groove. The pivotal hole is corresponding to the pivotal groove 1311 of the pivotal member 13. The pivotal member 23 perpendicularly connects with the pivotal member 13, and the pivotal groove of the pivotal member 23 faces the pivotal hole 1315. The linking member 30 passes through the pivotal hole 1315 and engages with the pivotal hole of the pivotal member 23 to connect the two pivotal members 13, 23 together. The linking member 30 is the same as the locking member 17 in structure.

During assembly, the pivotal member 13 is mounted on the rotating member 11 via the pair of pivotal portions 133 respectively received in the pair of rotating holes 1131. The base body 131 is partially received in the cutout 117, and the pair of bearings 15 are respectively received in the pair of rotating holes 1131 and respectively sleeved on the pair of shaft ends 1333. The pair of blocking portions 1533 resists a periphery of the pair of rotating holes 1131, respectively, to prevent the pivotal member 13 detaching from the rotating member 11. The pair of locking members 17 respectively engages with the pair of mounting holes 1335 of the pivotal member 13 and respectively resists the outer rings 153 of the pair of the bearings 15, such that the first rotating assembly 10 is assembled. The second rotating assembly 20 is assembled in the same way as that of the first rotating assembly 10. The pivotal member 13 and the pivotal member 23 perpendicularly abuts each other, the linking member 30 pass through the pivotal hole 1315 of the pivotal member 13 and engages with the pivotal hole of the pivotal member 23 to connect the two pivotal members 13, 23, such that the universal joint 100 is assembled.

When in use, the rotating member 11 is connected to a first arm (not shown), the rotating member 21 is connected to a second arm. The rotating member 11 is capable of rotating along an axis of the pivotal member 13, and the rotating member 21 is capable of rotating along an axis of the pivotal member 23. The axis of the pivotal member 13 is perpendicular to the axis of the pivotal member 23, such that a multiple-axes rotation can be achieved.

Figure 5:
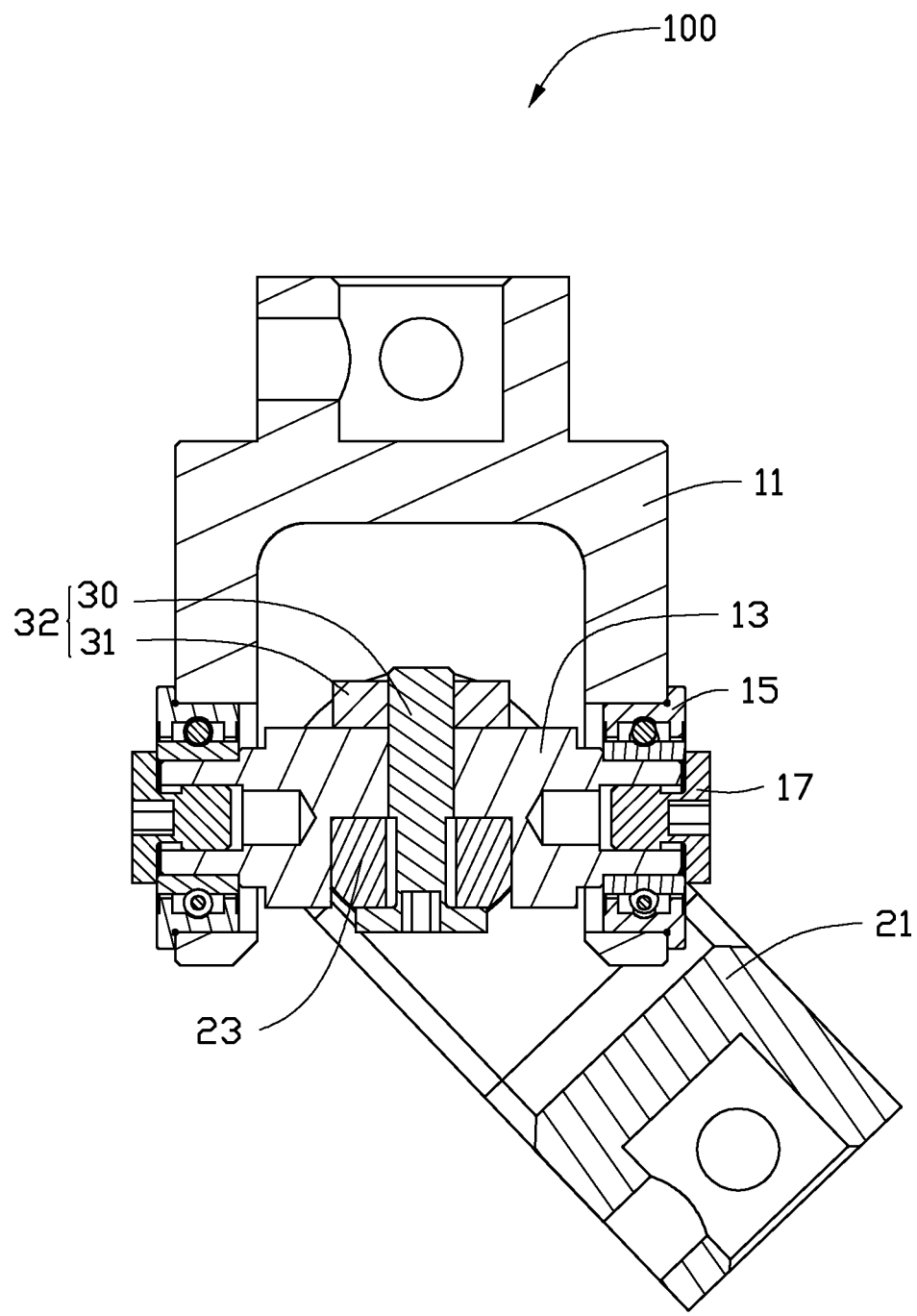
FIG. 5 is an assembled, isometric view of another embodiment of a universal joint.

FIG. 5 shows another embodiment of a universal joint similar to the aforementioned universal joint 100. The pivotal hole 1315 of the pivotal member 13 and the pivotal hole of pivotal member 23 may be both smooth holes. The linking member 30 passes though the smooth hole of the pivotal member 23 and engages with the pivotal hole 1315. An engaging member 31 is employed here to engage with the linking member 30 to connect the first rotating member 10 with the second rotating member 20. The engaging member 31 and the linking member 30 compose a linking assembly 32.

The pivotal groove 1311 of the pivotal member 13 and the pivotal groove of the pivotal member 23 may be both omitted, and the pivotal member 13 is perpendicularly connected to the pivotal member 23. The pivotal member 13 and the pivotal member 23 may be cylindrically shaped. When the shaft end 1333 of the pivotal member 13 is smooth enough and rotatably connected to the rotating member 11, the pair of bearings 15 may be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A universal joint, comprising:
    a first rotating assembly, comprising:
        a rotating member comprising a main body and a pair of rotating portions extending from opposite ends of the main body;
        a pivotal member rotatably connected to the pair of the rotating portions, the pivotal member comprising a base body and a pair of pivotal portions extending outwardly from opposite ends of the base body, wherein each pivotal portion is substantially a stepped shaft and extends coaxially from the base body, each pivotal portion comprises a resisting end connected to the base body, and a shaft end connected to the resisting end, each shaft end is rotatably connected to one of the pair of rotating portions, correspondingly, a diameter of the shaft end is less than that of the resisting end, each pivotal portion axially defines a mounting hole therein extending through the shaft end and the resisting end; and
        a pair of locking members respectively engages with opposite ends of the pivotal member to prevent the pivotal member detaching from the rotating member, the pair of locking members engaging with the pair of mounting holes of the pivotal member to rotatably connect the pivotal member to the pair of rotating portions of the rotating member;
    a second rotating assembly being the same as the first rotating assembly; and
    a linking member extending into the pivotal member of the first rotating assembly and engaging with the pivotal member of the second rotating assembly to connect the two pivotal members together.

2. The universal joint of claim 1, wherein the rotating member of the first rotating assembly further comprises a connecting portion, the pair of rotating portions of the first rotating assembly are perpendicular to the main body of the first rotating assembly, the connecting portion of the first rotating assembly perpendicularly extends from a middle portion of an another side surface of the main body of the first rotating assembly away from the pair of rotating portions of the first rotating assembly.

3. The universal joint of claim 2, wherein the main body of the first rotating assembly and the pair of rotating portions of the first rotating assembly cooperatively define a "U" shape cutout therebetween, the pivotal member of the first rotating assembly is received in the cutout.

4. The universal joint of claim 3, wherein the pair of rotating portions of the first rotating assembly and the main body of the first rotating assembly cooperatively defines a chamfered edge thereon corresponding to the cutout, each rotating portion of the first rotating assembly defines a rotating hole at the distal end away from the main body of the first rotating assembly, opposite ends of the pivotal member of the first rotating assembly are received in the pair of rotating holes of the first rotating assembly.

5. The universal joint of claim 3, wherein the base body of the first rotating assembly defines a pivotal groove on a middle portion of one side surface thereof, such that a pair of fixing portions of the first rotating assembly at opposite ends of the base body of the first rotating assembly are formed, the pair of fixing portions of the first rotating assembly extend perpendicularly from opposite ends of the base body of the first rotating assembly, the base body of the first rotating assembly defines a pivotal hole on a bottom of the pivotal groove of the first rotating assembly, and the linking member passes through the pivotal hole of the first rotating assembly and engages with the pivotal hole of the second rotating assembly.

6. The universal joint of claim 3, wherein each rotating portion of the first rotating assembly defines a rotating hole at the distal end away from the main body of the first rotating assembly, the pair of shaft ends of the pivotal member of the first rotating assembly are received in the pair of rotating holes of the first rotating assembly, the first rotating assembly further comprises a pair of bearings respectively received in the pair of the rotating holes of the first rotating assembly, the pair of bearings of the first rotating assembly receptively sleeved on the pair of pivotal portions of the first rotating assembly.

7. The universal joint of claim 6, wherein each bearing of the first rotating assembly comprises an inner ring and an outer ring rotatably sleeved on the inner ring of the first rotating assembly, the outer ring of the first rotating assembly comprises a circular base and a blocking portion extending from an end of the base outwardly along a radial direction of the base, the inner ring is sleeved on the shaft end of the pivotal portion of the first rotating assembly, the blocking portion of the outer ring of the first rotating assembly resists a periphery portion of the rotating hole of the first rotating assembly.

8. The universal joint of claim 7, wherein a diameter of the inner ring of the first rotating assembly is less than that of the resisting end of the first rotating assembly and greater that of the shaft end of the first rotating assembly, the inner ring of the first rotating assembly resists the resisting end of the first rotating assembly, the blocking portion of the first rotating assembly has a diameter greater than an internal diameter of the rotating hole of the first rotating assembly.

9. A universal joint, comprising:
a first rotating assembly, comprising:
a rotating member comprising a main body and a pair of rotating portions extending from opposite ends of the main body;
a pivotal member rotatably connected to the pair of the rotating portions, the pivotal member comprising a base body (131) and a pair of pivotal portions (133) extending outwardly from opposite ends of the base body, wherein each pivotal portion is substantially a stepped shaft and extends coaxially from the base body (131), each pivotal portion comprises a resisting end (1331) connected to the base body, and a shaft end (1333) connected to the resisting end, each shaft end is rotatably connected to one of the pair of rotating portions, correspondingly, a diameter of the shaft end (1333) is less than that of the resisting end (1331), each pivotal portion (133) axially defines a mounting hole (1335) therein extending through the shaft end and the resisting end; and a pair of locking members respectively engages with opposite ends of the pivotal member to prevent the pivotal member detaching from the rotating member, the pair of locking members (17) engaging with the pair of mounting holes of the pivotal member to rotatably connect the pivotal member to the pair of rotating portions of the rotating member;
a second rotating assembly being the same as the first rotating assembly; and
a linking assembly comprising a linking member and an engaging member, wherein the linking member extends into the pivotal members of the first rotating assembly and the second rotating assembly, and engages with the engaging member to connect the two pivotal members together.

10. The universal joint of claim 9, wherein the rotating member of the first rotating assembly further comprises a connecting portion, the pair of rotating portions of the first rotating assembly are perpendicular to the main body of the first rotating assembly, the connecting portion of the first rotating assembly perpendicularly extends from a middle portion of a side surface of the main body of the first rotating assembly away from the pair of rotating portions of the first rotating assembly.

11. The universal joint of claim 10, wherein the main body of the first rotating assembly and the pair of rotating portions of the first rotating assembly cooperatively define a "U" shape cutout therebetween, the pivotal member of the first rotating assembly is received in the cutout.

12. The universal joint of claim 11, wherein the pair of rotating portions of the first rotating assembly and the main body of the first rotating assembly cooperatively define a chamfered edge thereon corresponding to the cutout of the first rotating assembly, each rotating portion of the first rotating assembly defines a rotating hole at the distal end away from the main body of the first rotating assembly, opposite ends of the pivotal member of the first rotating assembly are received in the pair of rotating holes of the first rotating assembly.

13. The universal joint of claim 11, wherein the base body of the first rotating assembly defines a pivotal groove on a middle portion of one side surface thereof, such that a pair of fixing portions of the first rotating assembly at opposite ends of the base body of the first rotating assembly are formed, the pair of fixing portions of the first rotating assembly extend perpendicularly from opposite ends of the base body of the first rotating assembly, the base body of the first rotating assembly defines a pivotal hole on a bottom of the pivotal groove of the first rotating assembly, the linking member passes through the pivotal holes of the first rotating assembly and the second rotating assembly, then engages with the engaging member.

* * * * *